UNITED STATES PATENT OFFICE.

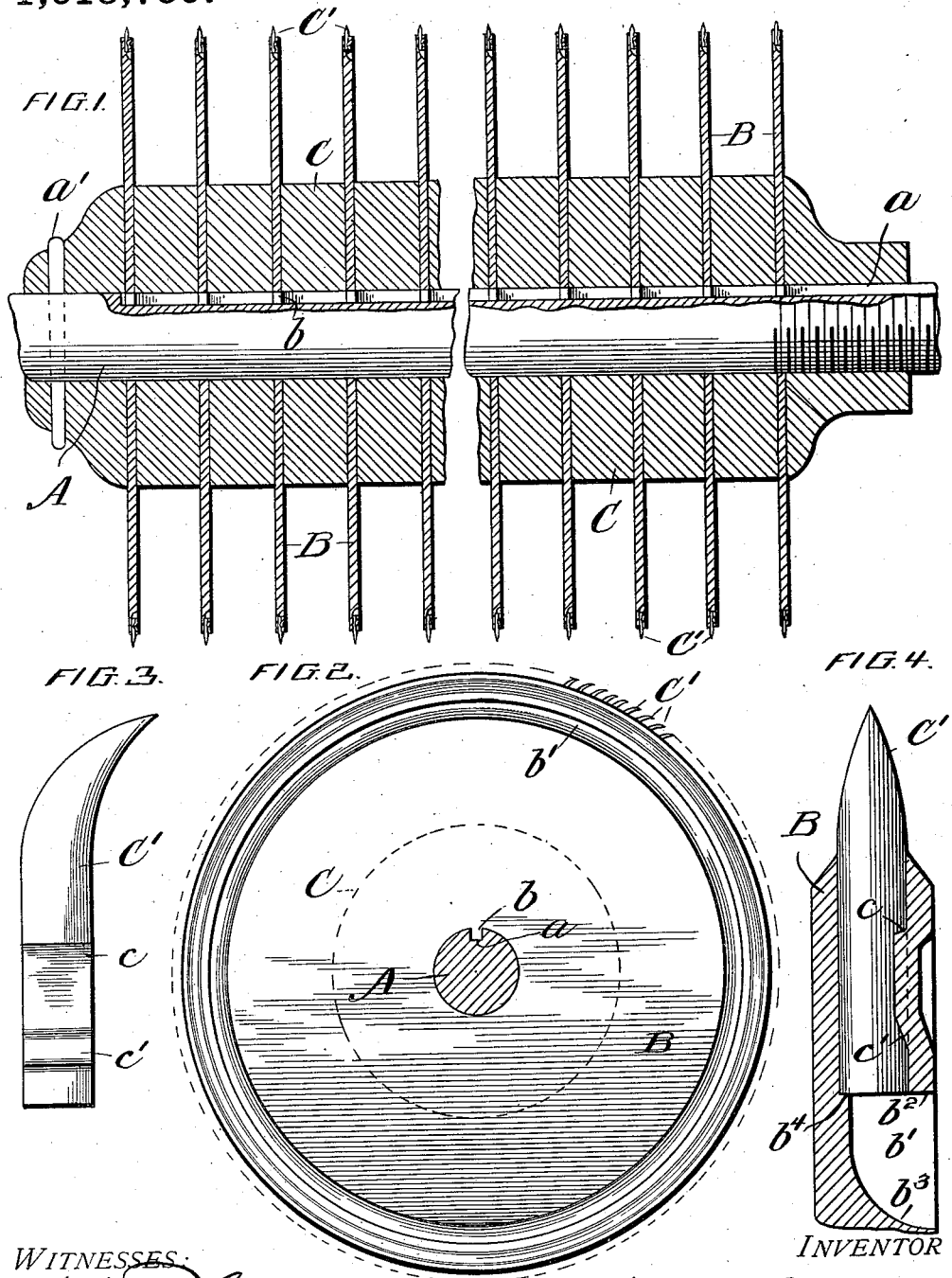

JAMES T. FULLER, OF CHATTANOOGA, TENNESSEE; CHARLES D. GORDON, OF CHATTANOOGA, TENNESSEE, ADMINISTRATOR OF SAID JAMES T. FULLER, DECEASED, ASSIGNOR TO L. T. FULLER AND MARY J. FULLER, BOTH OF HOUSTON, TEXAS.

CYLINDER FOR COTTON-GINS.

1,015,759.   Specification of Letters Patent.   Patented Jan. 23, 1912.

Application filed April 13, 1910. Serial No. 555,264.

*To all whom it may concern:*

Be it known that I, JAMES T. FULLER, a citizen of the United States, residing at Chattanooga, in the county of Hamilton and State of Tennessee, have invented certain new and useful Improvements in Cylinders for Cotton-Gins; and I do hereby declare the following to be a full, clear, and exact description of the invention, such as will enable others skilled in the art to which it appertains to make and use the same.

My present invention is an improvement in toothed cylinders for cotton gins and relates more particularly to cylinders of this character in which the disks of the cylinder are provided with teeth made independently and secured to project from the periphery of the disk.

In the accompanying drawing I have illustrated the best way in which I have contemplated embodying my invention and said invention is fully disclosed in the following description and claims.

In the said drawings, Figure 1 is a longitudinal section of a gin cylinder embodying my improvement but otherwise of ordinary construction. Fig. 2 is a transverse section of such a cylinder. Fig. 3 is a side view of an improved form of tooth employed by me, and Fig. 4 is a sectional view of a portion of the disk in which such a tooth is secured.

In the drawings A is the cylinder shaft. This shaft is provided with a longitudinal groove or gain $a$. The disks B are provided with an aperture through which the shaft is passed, each disk being provided with a short nib or projection $b$ to engage the groove or gain $a$ to hold the disks from turning upon the shaft. The disks are held apart or spaced by blocks C that may be of wood or metal and all of the parts may be held securely together upon the shaft in any preferred manner. In this instance they are shown as secured by the pin or rivet $a'$ at one end and by a nut at the other. The piece or block bearing against the outer disk at the right hand end of the cylinder is shown as being threaded to act as a nut in securing the disks and spacing blocks upon the shaft but a separate nut may be employed.

In preparing the disk which is of soft metal, to receive the teeth I first cut therein at one side thereof a short distance from the periphery, a groove $b'$ concentric therewith. This groove on the side toward the periphery of the disk has a wall $b^2$ at right angles to the side of the disk. The opposite side wall $b^3$ is curved as shown, or of an equivalent straight inclination. The disk is then provided with radial holes or openings to receive the teeth. These openings are preferably drilled into the soft metal disk and do not exactly register with the groove, though they extend inwardly to such grooves, but extend a little to one side of the same forming the shoulder $b^4$.

The tooth $C'$ is of the form shown in Fig. 3 having the curving and tapering point. The body of the tooth is cylindrical except that one side is formed with the broad shallow notch having a plane or flat bottom with the sharp angular shoulder $c$ at the end nearest the point of the tooth and the obtuse angular shoulder $c'$ at the other. These teeth are inserted in the holes drilled in the disk with the blunt ends against the shoulders $b^4$. They are then secured in position by pressing, punching or hammering the metal of the disk opposite the notch of the tooth, thus firmly securing the teeth in the disk. Should a tooth become damaged and it should be desired to remove it and replace it with a perfect tooth, the tooth may be forced out of the disk by driving the same out with a punch or a specially prepared tool. The incline $c'$ on the tooth will act as a wedge forcing the retaining metal in the notch outward. Another tooth may then be inserted and the same secured by forcing the metal of the disk into engagement with the notch of such tooth.

It is to be noted that the edge of the disk is chamfered off at each side of the row of teeth, so that there shall be no shoulder to obstruct the passage of materials toward the center of the cylinder.

What I claim and desire to secure by Letters Patent is:—

1. The herein described cylinder for cotton gins having disks of soft metal provided with teeth projecting centrally from the periphery of the same, said teeth being held in the disk by the metal of the disk, each tooth being independently secured and independently removable from the disk.

2. The herein described cylinder for cotton gins provided with disks of soft metal having teeth inserted in and projecting centrally from the periphery of the disk, said teeth being independently secured by the metal of the disk and independently removable from the disk.

3. In a cylinder of the character described, the combination with a disk having radial holes in its periphery and a concentric groove upon one side connecting with said holes, of teeth inserted and secured in said holes, the said groove giving access to the inner end of each tooth for removing the same.

4. In a cylinder of the character described, the combination with a disk having radial holes drilled in its periphery, and a concentric groove on one side communicating with said holes, of teeth inserted in said holes and each tooth independently secured by the metal of the disk.

5. In a cylinder of the character described, the combination with a disk having radial holes formed in its periphery, and a concentric groove on one side communicating with said holes, of teeth having on one side a shallow notch inserted in said holes and secured in position by having the metal of said disk forced into the notch of said tooth.

6. In a cylinder of the class described, the combination with a disk having radial holes in its periphery, and a concentric groove in the side of the same connecting with said holes, of teeth each provided with a notch in the side of the same, the inner end of said notch being inclined as described, said teeth being inserted in said holes in the disk and secured by the metal of said disk being forced into engagement with said notch.

In testimony whereof I affix my signature, in the presence of two witnesses.

JAMES T. FULLER.

Witnesses:
LUCY FULLER,
MARY J. FULLER.

---

Copies of this patent may be obtained for five cents each, by addressing the "Commissioner of Patents, Washington, D. C."